United States Patent
Kuruppu

(10) Patent No.: US 10,061,721 B2
(45) Date of Patent: *Aug. 28, 2018

(54) SYSTEM OF DATA HANDLING BASED ON PERIODIC INTERRUPTIONS TO ELECTRICITY SUPPLY

(76) Inventor: Indrajith Kuruppu, Kotte (LK)

(*) Notice: Subject to any disclaimer, the term of this patent is extended or adjusted under 35 U.S.C. 154(b) by 806 days.

This patent is subject to a terminal disclaimer.

(21) Appl. No.: 14/400,225

(22) PCT Filed: May 13, 2012

(86) PCT No.: PCT/IB2012/052378
§ 371 (c)(1),
(2), (4) Date: Apr. 10, 2015

(87) PCT Pub. No.: WO2013/171537
PCT Pub. Date: Nov. 21, 2013

(65) Prior Publication Data
US 2015/0242345 A1 Aug. 27, 2015

(51) Int. Cl.
*G06F 1/32* (2006.01)
*G06F 13/24* (2006.01)
*G06F 13/42* (2006.01)
*G06F 1/26* (2006.01)

(52) U.S. Cl.
CPC .......... *G06F 13/24* (2013.01); *G06F 13/4286* (2013.01); *G06F 1/26* (2013.01); *Y02D 10/14* (2018.01); *Y02D 10/151* (2018.01)

(58) Field of Classification Search
CPC ....................................................... G06F 13/24

USPC ......................................................... 713/300
See application file for complete search history.

(56) References Cited

U.S. PATENT DOCUMENTS

| | | | | |
|---|---|---|---|---|
| 5,461,266 A * | 10/1995 | Koreeda | ............... | G06F 1/3203 307/125 |
| 6,631,475 B1 * | 10/2003 | Nagayama | ............... | G06F 13/24 710/260 |
| 2005/0008146 A1 * | 1/2005 | Chheda | ................... | G06F 1/263 379/413 |
| 2006/0179332 A1 * | 8/2006 | Ether | ....................... | G06F 1/30 713/320 |
| 2008/0065920 A1 * | 3/2008 | Suginaka | ............... | G06F 1/3203 713/324 |
| 2009/0284643 A1 * | 11/2009 | Shibuno | ................. | G03B 13/00 348/347 |

(Continued)

*Primary Examiner* — Jaweed A Abbaszadeh
*Assistant Examiner* — Volvick Derose

(57) ABSTRACT

An approach to data handling based upon the temporal extents of the interruptions to supply of electricity to selected components is provided. At present, digital electronics and computing is primarily based on the binary system, with fixed time duration in and between the two electricity states in components. Considering the limitations posed, the present innovation employs instruments that utilize the no electricity temporal extents in the selected components, or parts thereof, in the data handling system (100) as a basis for reasoning over plurality of information, simultaneously. The use of dynamic durations in electricity states, including 'no electricity signal' states, accompanied by the punctuations that adopt dynamically determined temporal and electrical characteristics for data handling, in a scalable manner that is task effective and energy saving is disclosed.

63 Claims, 9 Drawing Sheets

(56) References Cited

U.S. PATENT DOCUMENTS

| | | | |
|---|---|---|---|
| 2011/0198943 A1* | 8/2011 | King | G04C 23/26 307/116 |
| 2012/0098340 A1* | 4/2012 | Yokoyama | H02J 3/14 307/31 |
| 2012/0167118 A1* | 6/2012 | Pingili | G06F 1/3206 719/318 |
| 2012/0235703 A1* | 9/2012 | Ueda | H05K 1/0268 324/763.01 |
| 2013/0103378 A1* | 4/2013 | Tinnakornsrisuphap | G06F 17/5009 703/18 |

* cited by examiner

SYSTEM OF DATA HANDLING BASED ON PERIODIC INTERRUPTIONS TO ELECTRICITY SUPPLY

TECHNICAL FIELD

Field of Invention

The present invention relates to data handling and more particularly to formulating a basis for data handling derived upon interruptions to the electricity supply to selected components, or parts thereof, of a data handling system at selected temporal extents.

Background

Computing and digital electronics play a significant role in almost all activities in the current context. With their increasing role, ever increasing amount of information is transferred and processed through computing and digital electronics.

At present, data in digital electronics and computing is primarily based on the binary system, which in turn, is formed by two electricity states, namely, power on-data on and, power on-data off durations to represent and handle data. A key feature in the present binary system is the fixed time duration in and between the two of the above-mentioned states in a given component in electronic and computing devices.

Another key characteristic of the binary system is that, it is primarily based on choosing one of the two states at a time. In order to obtain a useful output, thus, a binary system requires structuring real life problems into representation corresponding to these two states (e.g. numbers represented in radix-2 as combinations of data on (1) and data off (0) states) while being structured into sequences of questions and answers for operation of logic functions at logic gates that can be loosely termed electronic derivations of the well known Boolean logic.

Real life problems, however, are too complex for structuring into series of questions in the above manner and as a result, sequencing these problems into programming and configuring the hardware components accordingly, are among the well known challenges in present day computing and communication.

DETAILED DESCRIPTION

Figure 1:
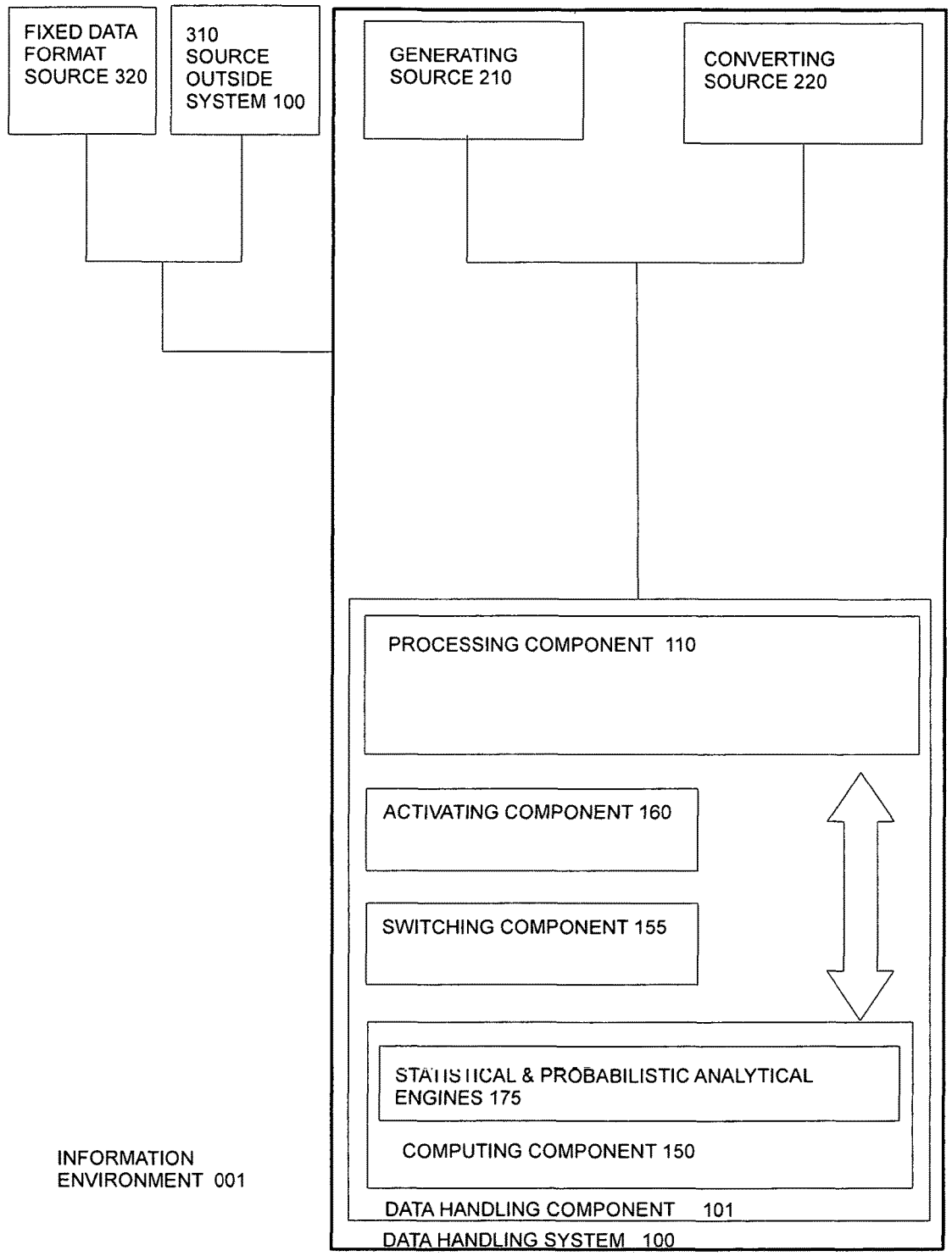
FIG. 1 illustrates a system that facilitates data handling in accordance with an aspect of the innovation.

The innovation presented and claimed herein, comprises a system that introduces a novel approach to data handling, which refers to in the claimed subject matter to include the following one or more aspects; formulating information as data, as well as transfer, processing, storing offline and in memory, generating output and transportation in communication frameworks.

The innovation is now described with reference to the drawings, wherein the reference numerals are used to refer to the same elements throughout. Numerous specific details are set forth in order to provide a thorough understanding of the proposed innovation. Well known structures and devices are shown in block diagram form in order to facilitate describing the innovation.

The terms 'component', 'unit', 'device', 'engine' and 'system' in this application are intended to refer to a data-related entity, either hardware, a combination of hardware and software, software or software in execution. For example, a component may be, but is not limited to being, a process running on a processor or a controller, a processor, an object, an executable, a thread of execution, a program, and/or a computer. Both an application running on a server and the server can be a component. One or more components can reside within a process and/or thread of execution, and a component can be localised on one entity and/or distributed between two or more entities. Each of the physical components in the system (100) is accompanied by a variable clock apiece.

The terms electricity state and data state in this application derives the same meaning and utilised for same purpose, with specific temporal and electrical characteristics. The term logic state in the context of the present application refers to a derivation of electricity state/data state in the time dimension. A logic state, while having specific temporal and electricity characteristics as well as a logic identity, may or may not be ascribed with a corresponding value. A data state and a logic state may be accompanied by punctuations that have specific electrical and temporal characteristics.

As used herein, the terms to infer or, inference refer generally to the process of reasoning about or inferring states of the system, environment, and/or user from a set of observations as captured through events and/or data. Inference may be employed to identify a specific context or action, or, for example, can generate a probability distribution over states. The inference can be probabilistic, or, the computation of a probability distribution over states of interest based on a consideration of data. Inference may also refer to instruments employed for composing higher level action from a set of data and/or events. Such inference results in the construction of new actions from a set of observed and/or stored data, irrespective of whether they are correlated in close temporal proximity or not, and whether the data come from one or several sources.

Reference the drawings FIG. 1 illustrates a system (100) that handles data from a number of sources in an information environment (001). As revealed in FIG. 1, system (100) includes a data handling component (101) that handles data received from a plurality of sources, and they may be categorised as sources within and outside the system (100). As the FIG. 1 further illustrates, the data handling component (101) further comprises a processing component (110) to transfer data with the plurality of sources and, a computing component (150) that employs a plurality of statistical and probabilistic analytical engines (SPAE) (175).

One major overall goal of the present innovation is to enable the system (100) to handle data from these plurality of sources simultaneously, and in dynamically formulated task specific data formats to generate output effectively and with optimum performance in an energy saving manner.

In accordance with the present innovation, as further illustrated in FIG. 1, the novel techniques adopted therein facilitates handling of data within a information environment (001) including those 'generated' at the sources (210) (e.g. keyboards, mice) and 'converted' at the sources (220) (e.g. microphones, webcams) that are part of the system (100), as well as those received from outside the system (100) from sources (310) in other similar systems that operate on dynamically formatted data formats or sources (320) from systems that are on fixed data formats (e.g. binary format).

Figure 2:
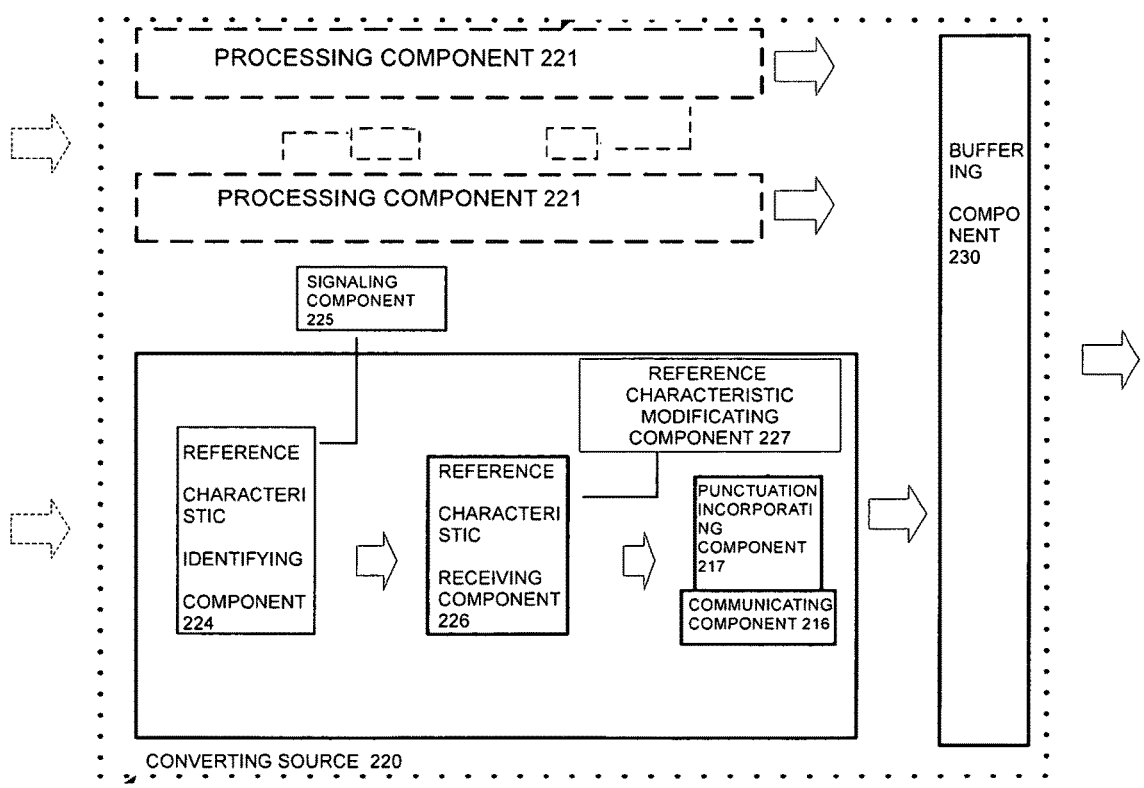
FIG. 2 illustrates a system that facilitates dynamic formulation and transfer of data at a 'converting source' in accordance with an aspect of the innovation.

In one aspect of the present innovation, each of the converting sources (220), illustrated in FIG. 2, comprises a plurality of processing components (221) and a modified buffering component with shared locations (230) coupled to a location controlling component each coupled to a variable clock each. Each of the processing components comprises a reference characteristic identifying component (224), a signaling component (225), a reference characteristic receiving component (226), and a reference characteristic modificating component (227), a modified communicating component (216) coupled to a punctuation incorporating component (217), and each of the above connected to a variable clock apiece. The modified buffering component (230) facilitate transfer of data based on the instructions of the computing component (150) and the statistical and probabilistic engines (SPAE) (175) of the data handling component (101).

Figure 3:
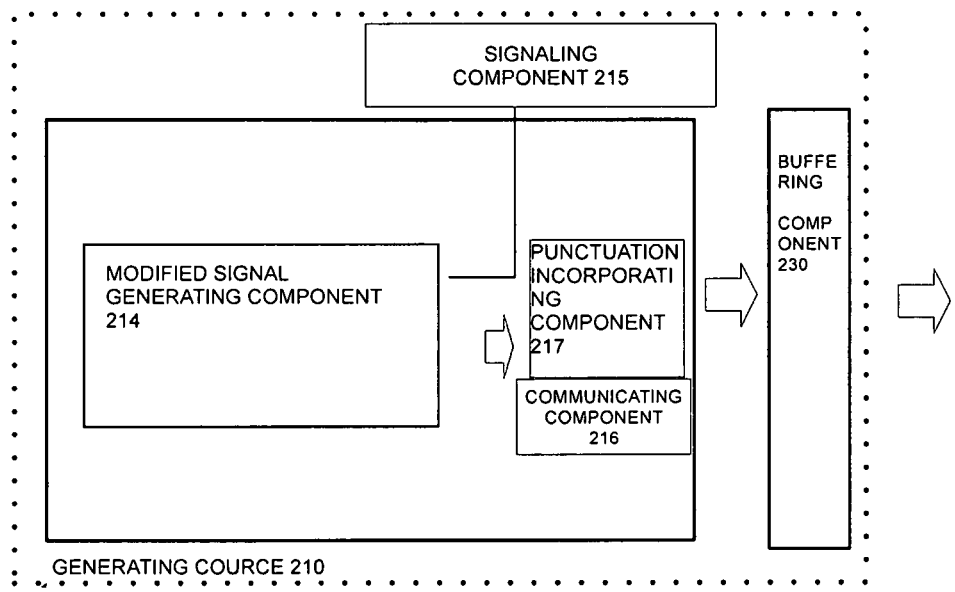
FIG. 3 illustrates a system that facilitates dynamic formulation and transfer of data at a 'generating source' in accordance with an aspect of the innovation.

In another aspect of the present innovation, as illustrated in FIG. 3, the system receiving data from 'generating' source (210) has a modified signal generating component (214), a signaling component (215), a modified communicating component (216) coupled to a punctuation incorporating component (217) each of the above connected to a variable clock each, in the processing component (211). As the FIG. 3 further illustrates, a modified buffering component (230), with shared locations coupled to a data controlling component and to a variable clock, facilitates transfer of data based on the instructions of the computing component (150) and the statistical and probabilistic engines (SPAE) (175) of the data handling component (101).

Figure 4:
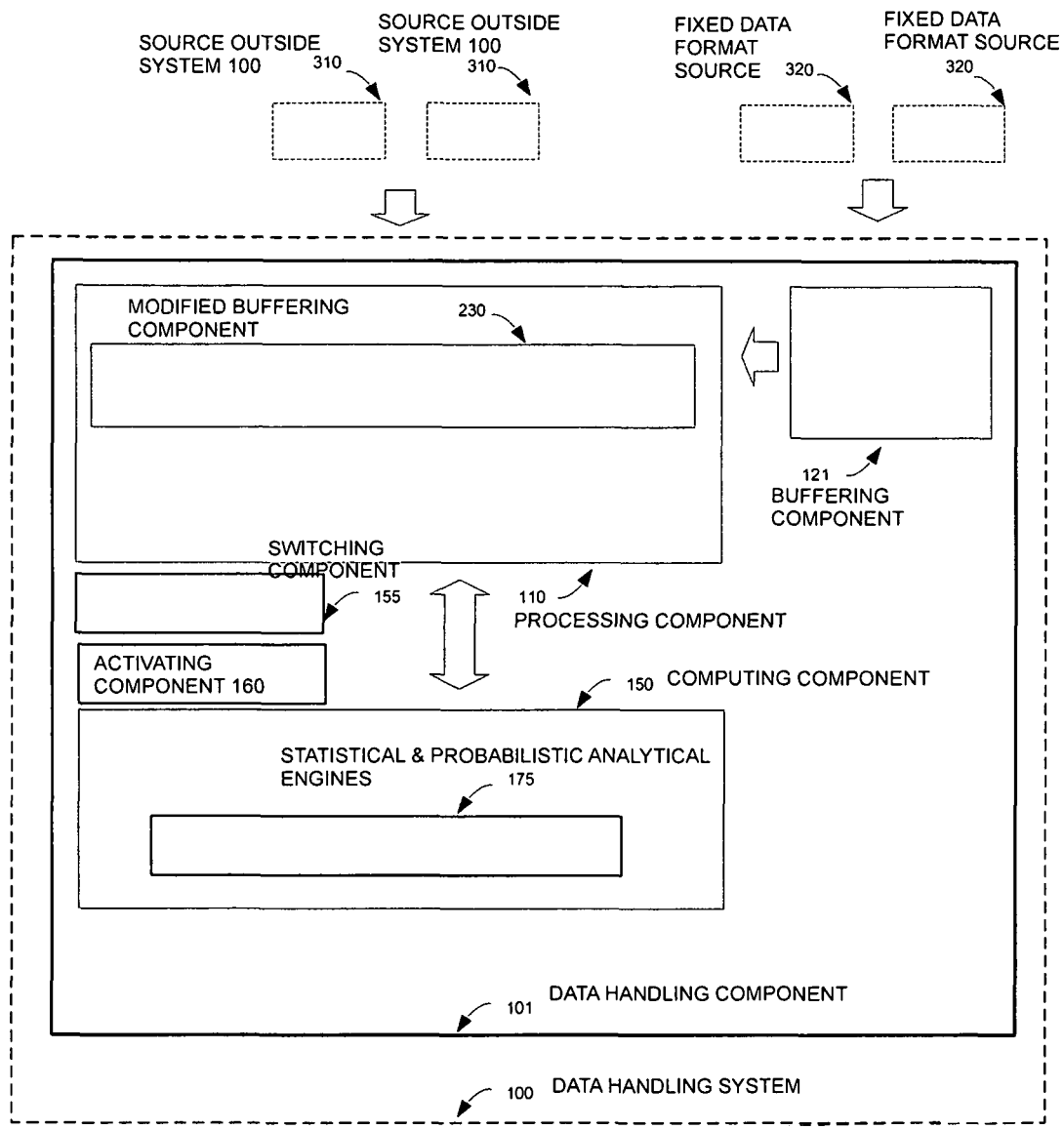
FIG. 4 illustrates a system that facilitates formulating interrelations with different sources for transfer of data in accordance with an aspect of the innovation

In another aspect of the present innovation, as illustrated in FIG. 4, the system (100) receives data from sources (310) in other similar systems at the modified buffering component (230), with shared locations coupled to a location controlling component and a variable clock, through a plurality of modified communicating components (216) each coupled to a punctuation incorporating component (217) and a variable clock apiece, in the processing component (110). The data from the sources (320) in the systems with fixed data formats are received at the buffering component (121) for facilitating data transfer with the processing component (110) based on the instructions of the computing component (150) and the statistical and probabilistic analytical engines (SPAE) (175) of the data handling component (101). As further illustrated, the switching component (155) receives a signal transferred from any signaling component (215, 225) in the sources upon the commencing and concluding of a predetermined activity (e.g. push of a key stroke, touch of a touch pad) on information generation or conversion. The switching component (155), in turn, transfers the signals to the data handling component for effecting resuming and interrupting the supply of electricity to selected components at the respective sources.

In accordance with the subject innovation, the novel instruments adopted therein incorporate transmission of electricity within the components as an activity with specific durations and output in a data handling system as it provides energy for the operation of the system as well as the basis for data handling.

Figure 6A:
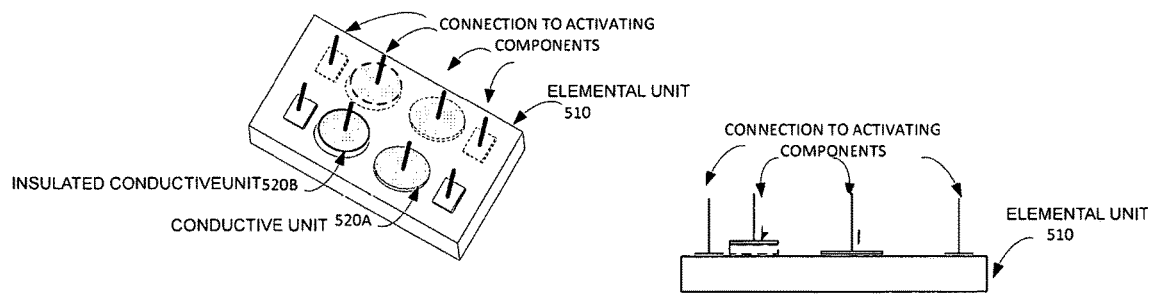
FIG. 6A illustrates a schematic representation of the smallest scale units, the elemental unit, the conductive unit and the insulated conductive unit, that facilitates data handling in accordance with an aspect of the innovation
Figure 6B:
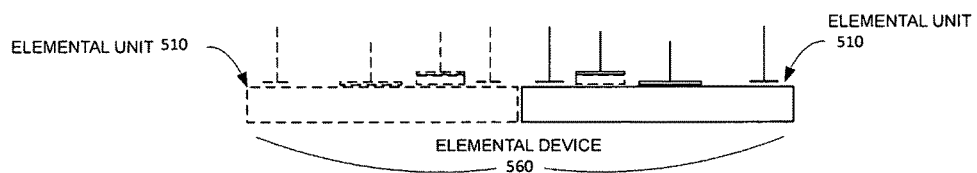
FIG. 6B illustrates a schematic representation of one of the smallest scale components, the elemental device that facilitates data handling in accordance with an aspect of the innovation
Figure 6C:
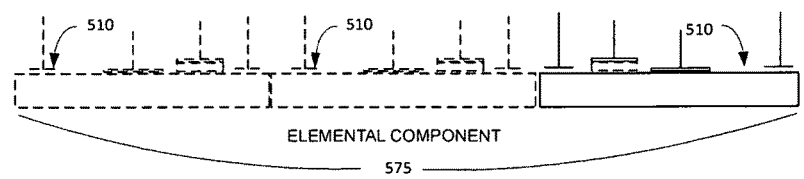
FIG. 6C illustrates a schematic representation of one of the smallest scale components, the elemental component, that facilitates data handling in accordance with an aspect of the innovation
Figure 7:
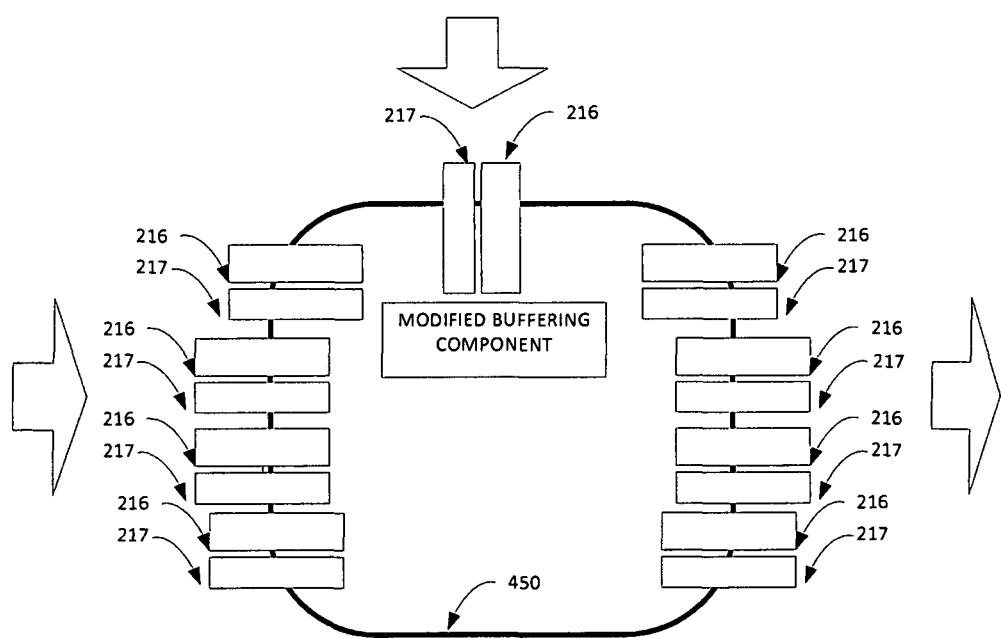
FIG. 7 illustrates schematic representation of a typical arrangement of a modified logic gate in accordance with an aspect of the innovation

As data handling is closely interlinked with other associated activities, including the respective constituent features in components and devices in the system (100) including elemental units (510), elemental devices (560) and elemental components (575), illustrated in FIGS. 6A, 6B and 6C, establishing predetermined levels of conductive and non-conductive properties respectively, for quantifiable temporal extents and also with the related phenomena (e.g. current gain-bandwidth corresponding to a fixed voltage the respective charge carriers, for example, electrons, receiving required energy quanta), in one key aspect of the present innovation, the novel instruments therein formulate interrelations and their patterns among those activities and phenomena at different scales. These different scales include, in one key aspect of the present innovation, the elemental units (510), the conductive units (520A) and the insulated conductive units (520B), the elemental devices (560), the elemental components (575) as well as the devices and components utilised in different applications, including, but not limited to, switching and signal amplifying, for facilitating formulating these robust bases and expanding the scope of data handling.

By facilitating establishment of the interrelations and their patterns at these scales, the novel instruments adopted in the present innovation enable formulating a basis for approaching the smallest units in the system (100), namely, the elemental unit (510), the conductive unit (520A) and the insulated conductive unit (520B) as independent operational entities in the system. These novel instruments, by approaching these smallest operational units as independent entities, in one key aspect of the present innovation, establish a plurality of dynamically determined levels of electrical properties (e.g. conductivity and non-conductivity levels) in each of the elemental units (510) and their compositions (e.g. in elemental devices, elemental components and in components) associated with transmission of electrical signals as well as in the conductive units (520A) and in the insulated conductive units (520B).

In one key aspect of the present innovation, each of the elemental units (510) and each of the conductive units (520A) and the insulated conductive units (520B) is connected to at least one of the plurality of activating components (160) that operate based upon the instructions of the computing component (150) and the statistical and probabilistic analytical engines (175), for supplying external electrical energy for dynamically determined temporal extents, in order for establishing dynamically determined levels of electrical properties associated with facilitating and interruption to transmission of electrical signals through the different combinations of these elemental units (e.g. elemental devices, elemental components). The novel instruments, in accordance with the present innovation, utilise these connectivities for supplying external electrical energy, in different combinations of electrical characteristics for dynamically determined temporal extents, to enable each of these elemental units and its compositions attaining dynamically determined levels of electrical properties associated with electrical conductivity, in order to effect interruptions and resumption of transmission of electricity signals, as required by different applications.

While the elemental units can be processed making use of the widely adopted technologies, commonly referred to as semi conductor technologies, that deal with exploiting the properties of semi conducting materials that have added chemicals, i.e. 'doping agents', enabling them attaining electrical conductivity upon supply of external electrical energy, in accordance with the present innovation, the novel instruments adopted therein, establish the interrelations and their patterns of each of the pluralities of combinations of electrical properties in supply of power (e.g current, amplitude of voltage) and the corresponding aspects related to levels of electrical conductivity at each of these units, including the temporal extents related to a plurality of transitions from each of the predetermined levels of conductivity to another, which, in turn, determines the possibility of transmission of electricity, based upon the variable operational step of the computing component and the statistical and probabilistic analytical engines.

In accordance with the present innovation, the shortest variable of the operational steps of the computing component (150) and the statistical and probabilistic analytical engines (175), is lesser than the shortest temporal extent of transition from each of the dynamically determined levels of conductivity to any other dynamically determined level of conductivity in each of the elemental units (510), as instructed by the component (150), in the data handling system.

Since each of these elemental units facilitate transmission of electricity upon supply of external electrical energy, the novel instruments adopted in the present innovation dynamically configure a plurality of such units by electrically interconnecting them and supplying them with external power and varying the combinations in these interconnections as well as the electrical characteristics in electricity supply at dynamically determined temporal contexts, utilising the activating components (160) and the computing component (150) and the statistical and probabilistic analytical engines (175).

In specific applications, including data handling, the elemental units (510) are configured to form elemental devices (560) and elemental components (575), which, in turn, constitute the components and other devices, for specific temporal extents, dynamically determined by the computing component, based on the inferences of the statistical and probabilistic analytical engines in relation to the tasks and the roles of these configurations across different scales (e.g. elemental devices and elemental components, components). In one key aspect of the present innovation, these novel instruments analyse the overall tasks (e.g. facilitating the supply of a high quantum electrical energy for a component, transfer of a single data) and formulate the structure and organisation of the dynamically formulated electrical and temporal characteristics in each of the plurality of electrical signals that transmit through each of such configurations, and the duration between such signals in carrying out these overall tasks, in dynamically determining each of these configurations of the smallest units, namely, elemental unit, and the electrical signals that transmit and the temporal extents between them.

In accordance with the present innovation, these novel instruments, based on their analyses, the interrelations and their patterns of the temporal extent of each of the transitions from one dynamically determined level of electrical properties to another (e.g. high conductivity level to just below threshold of cut off level for conductivity) at individual elemental units and as configurations, dynamically formulate the optimum configuration required for each of the specific transmission of electrical signals, in relation to the plurality of electrical signals for conducting the overall task, mentioned supra. By formulating each of the configurations of these units for the transmission of each of the electrical signals within a group of electrical signals and the durations between two of such signals that would be transferred to carry out the overall task, based upon the instructions of the computing component (150) deriving on the inferences of the statistical and probabilistic analytical engines (175), in one key aspect of the present innovation, these novel instruments establish the bases for data handling adopting the optimum resources (e.g. number and structure of the units in these configurations, composition of external electrical energy supply) as well as effectiveness in conducting each of its tasks (e.g. data formulation, transfer, processing, storing). In dynamically establishing the optimum configurations of these units and the optimum electrical and temporal characteristics of each of the electrical signals transmitted, these novel instruments utilise the respective behavioural properties in each of these units (e.g. the elemental units, the conductive units and the insulated conductive units) in relation to the respective transitions from one dynamically determined level of conductivity to another dynamically determined level of conductivity upon the different electrical and temporal characteristics in supply of external electrical energy. For example, a small temporal extent for transition from the no conductivity threshold level to conductivity level with a small external electrical energy input for a short duration as well as upon the interruption to supply of external energy, reverting in a short transition to the no conductivity threshold state from that of conductivity, would be the properties that facilitate formulating the punctuations that accompany data. As the data states optimally comprise no electricity characteristics, in accordance with the present innovation, formulating and transferring of the punctuations with minimum extents and durations of external electrical energy inputs utilising these properties in the smallest scale units (e.g. elemental units, elemental devices) facilitate minimising electrical energy leakage beyond the limits of the configurations of these units.

An elemental unit may individually or, in combination with more elemental units, derive one electrical functionality (e.g. negative, source), for the specific temporal extents and, has external power supplied with electrical and temporal characteristics, in terms of the instructions by the computing component based on the inferences of the statistical and probabilistic analytical engines. The configurations of elemental devices (560) each comprising two or more groupings of such elemental units, and the elemental components (575) comprising three or more such groupings of elemental units, based on the instructions of the computing component wherein, each of the groupings assumes an electrical functionality opposite to that of such composites electrically interconnected with it, while the required external electrical energy inputs are provided to establish the dynamically determined levels of properties that facilitate different levels of electrical conductivity, in order for such elemental devices (560) and elemental components (575) to make interruptions to and resumption of transmission of electricity signals. In accordance with the present innovation, the novel instruments therein, based upon the analyses, provide the required amount of external electrical energy in dynamically determined properties, at the required temporal extents, to each of the respective grouping of elemental units with the corresponding electrical functionality, in the elemental devices and in the elemental components, in order to facilitate transmission of electricity. The novel instruments, upon establishing that the dynamically determined electrical energy inputs at each of these configurations of elemental devices and elemental components respectively, has attained the dynamically determined electrical property levels, based on the comparisons with previous analyses of the respective properties, utilise these devices (560) and components (575) to transmit electrical signals, in dynamically determined characteristics, for a wide range of applications.

Since the novel instruments, adopted in the present innovation, facilitate each of the elemental units and its groupings assuming dynamically determined electrical functionalities (e.g. negative, source), with dynamically determined levels of conductivity, for variable temporal extents, the configurations of the elemental devices, their functions and capacities for transmitting these electrical signals can be optimised, improving the utilisation of resources and, outcome as well. In optimising the resources and outcome, in accordance with the present innovation, the novel instruments adopted herein, dynamically activate and deactivate the electrical interconnectivities of each of the elemental units associated with the respective dynamically formulated configurations of elemental devices and elemental components subsequent to the transmission of each signal with electrical characteristics, in order to maintain the optimum level of electrical properties at each of such elemental units, as determined by the computing component (150) based on the inferences of the statistical and probabilistic analytical engines (175), utilising the activating components (160).

The novel techniques, adopted in the present innovation, in configuring the elemental devices (560), and elemental components (575), that assume conductivity upon creation of an electrical field created by the respective pluralities of conductive units and insulated conductive units, where the respective fields with required electrical and temporal properties may be created adopting combinations of conductive units (520A) and insulated conductive units (520B), for which insulating materials containing Silicon Dioxide, among others, are commonly utilised. In configuring elemental devices, elemental components and their combinations, based upon the analyses, these novel instruments supply external electrical energy with the required combinations of electrical and temporal characteristics through the respective activating components (160) to the selected conductive units (520A) and the selected insulated conductive units (520B) in the dynamically formulated configurations, for creating the electrical fields with the dynamically determined characteristics, in order for the charge carriers to establish the level of conductivity with dynamically determined properties, for the dynamically determined temporal extents. In one key aspect of the present innovation, as each the conductive units (520A) and the insulated conductive units (520B) is connected to one or more elemental units (510) that are configured for forming the elemental devices and elemental components, the novel techniques adopted in the present innovation dynamically determine the specific numbers, compositions and temporal extents of these conductive units to be activated for creating the electrical fields, in order for establishing the dynamically determined levels electrical properties that facilitate transmission of electricity signals and the interruptions to such transmissions.

In facilitating interruptions to and resuming each of the transmissions of electrical signals, dynamically determined combinations of the conductive units (520A) and insulated conductive units (520B) as well as the connections of each of the elemental units (510) to obtain electrical energy through activating components (160), in accordance with the present innovation, are utilised, based on the instructions of the computing component (150) that derive upon the inferences of the statistical and probabilistic analytical engines (175).

In different operational contexts (e.g. computing, communication), deriving upon the increased possibilities of combinations in supply of external electrical energy, for dynamically determined temporal extents, with variable electrical characteristics, greater operational opportunities exist for each of the elemental units and its different formations that combine to formulate each of the electrical functionalities assisted by the combinations of the respective conductive units, to assume a plurality of functions according to different requirements and applications, based on the instructions by the computing component and the statistical and probabilistic analytical engines. As a result, in accordance with the present innovation, each of the elemental devices, elemental components and their scalable combinations are able to assume multi functional roles as well, since the novel instruments therein utilise the varying temporal and other related characteristics in establishing the dynamically determined levels of electrical properties that facilitate interrupting to and resuming transmission of electricity in the constituent elemental units in pluralities of combinations, upon being supplied with external electrical energy in a variety of combinations of electrical characteristics (e.g. voltage, current) for different temporal extents, thus enabling, optimising the types, numbers and permutations in corresponding temporal extents in the operation of respective components and their parts. Dynamically formulating each of the plurality of electricity signals in relation to the specific applications, in one key aspect of the present innovation, in terms of the minimum required energy levels, with optimum time intervals between such signals, facilitate creating these greater operational opportunities, as the novel instruments adopted in the present innovation formulate the configurations of these units and transmission of signals maintaining the optimum electrical energy levels in such units (e.g. threshold conductivity level in elemental units, threshold electrical field emitting level in conductive units and insulated conductive units) engaged in each of such signal transfers as well as those not engaged, at the required levels, for the required temporal extents, thus, avoiding electrical energy leakages, that cause errors and energy losses at these smallest scales as well.

The novel instruments in the present innovation, adopting the temporal extents of the interruptions to supply of electricity, utilise return electrical charge produced upon each of these interruptions at the elemental units, the respective conductive units and the elemental composites as well as at various components comprising them, to provide at least part of the electricity supply required for operation of other such units, devices and elemental components. These novel techniques adopting the activating components (160) that operate in variable operational steps that have shorter variables than the temporal extents of transition among dynamically determined levels of conductivity in the elemental units and their combinations, based upon the instructions and inferences of the computing component and statistical and probabilistic analytical engines, direct the 'return electrical charges' due to the interruptions to the electricity supply, to other selected elemental units, elemental devices, elemental components and other devices in data handling the system, upon assessing the respective energy requirements and the corresponding properties of these return electrical charges.

In accordance with the present innovation, while optimising the supply of external electrical energy with specific temporal extents for the elemental units and elemental composites that constitute elemental devices and elemental components of the components and their parts in the system (100) and with different combinations of characteristics (e.g. voltage, current), these novel instruments adopt the respective temporal extents of the interruption to and resumption of transmission of electricity, in order to diversify the bases of operation of data handling. In diversifying the bases of operation, these novel instruments utilise the multi-dimensional contributions of electricity in data handling in the system (100), namely, as a source of energy for operation of the system, as well as in formulating data states and the punctuations with dynamically determined characteristics based on the temporal extents of interruptions to and supplying of external electrical energy with variable electrical characteristics in different scales including elemental units, elemental composites and the pluralities of their compositions.

Thus, in one key aspect of the present innovation, these novel instruments utilise the periodic interruptions to supply of energy, i.e. electricity, as an instrument to diversify the bases of operation in data handling, in terms of the temporal dimension as well as in electrical characteristics. While the interruptions are of dynamically determined durations, these novel instruments adopt the time dimension and its units, derived from 'no electrical signal' durations, in order to diversify the bases of operation of data handling. In diversifying bases of operation, the novel instruments adopted in the present innovation utilise supplying and interruptions to external electrical energy that facilitates conductivity, as a multifaceted tool, wherein these external electrical energy inputs are dynamically varied, based upon the analyses, that disclose the temporal extents and the electrical energy variations (e.g. increases and reductions) required for transition from one dynamically determined level of conductivity to another dynamically determined conductivity level. These novel instruments, based upon the analyses, maintain conductivity in these units at dynamically determined levels (e.g. just below the lowest conductivity threshold level, high conductivity level, well below lowest conductivity threshold level) accounting for interrelations and their patterns of the temporal extents and the external energy as well as the properties of the electrical signals, including no electrical signals, that are utilised for conducting different aspects of data handling (e.g. converting, transferring, processing, communicating).

Broadening the bases of operation, in terms of the temporal dimension, as well as the electrical characteristics, facilitate expanding the possibilities and opportunities for more effective and energy efficient data handling.

In accordance with the present innovation, though by no means exhaustive or defining the scope of applicability, its applications in some key aspects in data handling can be described in terms of the following:

a) generating/converting data at source & transferring
b) implementing logic functions
c) storing and retrieving data
d) communicating/transferring data In one key aspect of the innovation, as mentioned above, in generating data at source and transferring a signal, created by the commencement of an activity (e.g. a keystroke), from the signaling component (215) at the source (210), is received at the data handling computing component (101), for commencing electricity supply to the generating source (210) for initiating creation of data state. While initiating supply of electricity, the computing component (150) and the statistical and probabilistic analytical engines (SPAE) (175) instruct the modified signal generating component (214) on the corresponding identity of the implement from which the activation signal originated, in order to create the data state.

As each signal generator in the component is provided with a corresponding identity, the modified signal generating component (214) and its accompanying variable clock, as instructed by the computing component (150) based on the inferences by the statistical and probabilistic analytical engines (SPAE) upon its analysis, transfers a signal based on the variable operational step corresponding to such identity to the modified communicating component (216).

In one key aspect of the present innovation, the modified communicating component (216) and its accompanying variable clock incorporates the optimum electrical characteristics, including 'no electricity', and temporal characteristics, in terms of the variable operational step of the computing component (150), and the punctuation incorporating component (217) incorporates the punctuations with corresponding electrical and temporal characteristics upon the instructions of the computing component (150) derived upon the inferences of the statistical and probabilistic analytical engines (SPAE) for transferring data.

In transferring data states, in one key aspect of the present innovation, the novel instruments therein, adopting the computing component (150) and the statistical and probabilistic analytical engines (SPAE) (175) analysing the signal generating sequence originating at source (210), formulate the patterns in order to transfer them in an optimum manner. For example, in transferring a text, instead of transferring letter by letter, these novel instruments analyse signal generation and formulate patterns to enable making inferences on the optimum combination of signals (e.g. entire word or entire groups of words including spaces and punctuations).

In accordance with the present innovation, the punctuation incorporating component (217) coupled to the modified communicating component (216), together with the variable clock, provide the punctuations to the data states by effecting variations in electrical characteristics for durations instructed by computing component (150) based on the inferences by the statistical and probabilistic analytical engines (SPAE) (175). As mentioned above, the punctuations signify the start and end of the data states and enables error handling in data transfer involving modified communication components and buffering components, as well as facilitating implementing logic functions at the modified logic gates (450). In one key aspect of the present innovation, similar to modified communication components (216) in the system (100) that can perform sending and receiving the data, the punctuation incorporating components (217) assume both roles, namely, incorporate these punctuations in sending, and, lock them in receiving data states. While the component (217) is performing both these tasks, the terms punctuation incorporating component and the punctuation locking component are used herein, to distinguish the specific task in relation to the stage of data handling. Since it is evident that when a modified communication component (216) is engaged in a task in data handling in the system (100), a punctuation incorporating component (217) is associated with it, it is not mentioned in describing more complex contexts in the application of the present innovation.

The punctuations, mentioned supra, are effected by the punctuation incorporating component that accompany the modified communicating component, each connected to a variable clock by incorporating dynamic variations in punctuation intervals, while effecting variations of electrical characteristics for dynamically determined temporal extents of not less than that of variable operational step of the modified communicating components, based on the instructions by the computing component (150) derived upon the inferences of the statistical and probabilistic analytical engines (SPAE) (175).

In error handling, the computing component and statistical and probabilistic analytical engines (SPAE) receive a return signal from the modified communication component, whether the specific punctuations that correspond to the start and end of the transfer of the specific data has been received, that, in turn, instruct the transmitting modified communicating component, on the necessity of resending the data state to ensure data transfer is complete.

In accordance with the present innovation, at the sources involving 'conversion' of data (e.g. microphone), similar techniques are applied to formulate data states, as done at a 'generating' source described earlier. As mentioned supra, the novel instruments in the present innovation upon receiving a signal from a signaling component (225) at respective sources (220) to the data handling component (101) to initiate electricity supply to activate converting of information as data. While initiating supply of electricity, the computing component (150) and its statistical and probabilistic analytical engines (SPAE) (175) analyse the electrical properties created upon receiving the information to be converted, in order to establish the interrelations and the patterns of the interrelations of the respective electrical characteristics in terms of the variable operational step. While these characteristics are received at the component (226), these analyses are conducted and, in one key aspect of the present innovation, in terms of the inferences by statistical and probabilistic analytical engines (SPAE) that adopt the interrelations and the patterns of interrelations among similar analyses and their outcome, the computing component (150) instructs each of the reference characteristic modificating components (227), on the necessity and the extent to vary each of the corresponding references upon which the variable rate, as well as the temporal extents of the analysing of each of such characteristics is based as well as the durations, at which the respective interruptions to receiving such characteristics to be effected.

Based on the inferences of statistical and probabilistic analytical engines (SPAE) that utilise the interrelations and patterns of interrelations of the above analyses and their outcome, the computing component (150) makes instructions to the respective characteristic receiving component (226) to transfer a signal to the modified communicating component (216) to formulate data corresponding to the information received at the component (226), based upon the variable operational step of the component (150) and the accompanying punctuations for transferring to the processing component (110) in the data handling component (101).

In one key aspect of the present innovation, these novel instruments adopting the techniques outlined above, provide a basis to analyse the information received from the sources (e.g. moving animal generating audio visual and infrared based information) that do not establish information transfer or analysing protocols, as the analyses utilising the components (224, 226, 227) by the computing component (150) and the statistical and probabilistic analytical engines (175) establish the basis for formulation of data.

In accordance with the present innovation, novel techniques are adopted to create data states with dynamically variable electrical characteristics and temporal characteristics, based on the variable operational steps of the computing component (150), assisted by the statistical and probabilistic analytical engines (SPAE) (175) for optimum resource usage and effective data handling.

In one key aspect of the present innovation, the plurality of modified communicating components (216) is configured for data transfer simultaneously, mainly adopting the 'no electricity' data state, as it becomes possible for flexible utilisation of data transferring ports, enabling simultaneous transfer of data. In accordance with the present innovation, the computing component and the statistical and probabilistic analytical engines (SPAE) provide dynamic identities to the each of the modified communication components (216) and the configured groups of modified communication components and assign creation of data states for information received from generation as well as conversion sources.

In one key aspect of the present innovation, these novel techniques, adopting the plurality of modified communicating components, transfer the plurality of data that have different temporal extents (e.g. $\frac{1}{15} \times 10^6$ and $\frac{1}{35} \times 10^6$ of a second) in one duration (e.g. $\frac{1}{10^8}$ of a second) to the modified buffering component (230) with shared locations in the processing component (110). The time and location identities of the respective data, however, enable the computing component and the statistical and probabilistic analytical engines (SPAE) to locate and assign the data states in buffering and also in subsequent stages in data handling.

In accordance with the present innovation, several novel techniques and instruments are adopted in processing the data in the system (100). A key aspect of processing in the system is the plurality of buffering components with shared locations that receive data at different locations in the system, as they are transferred through different stages of processing to produce the outcome. In one key aspect of the innovation, buffering components with shared locations for buffering embodies novel techniques that enable calling for and accessing data based on different requests, simultaneously and, from different sources including those at remote locations.

Figure 5:
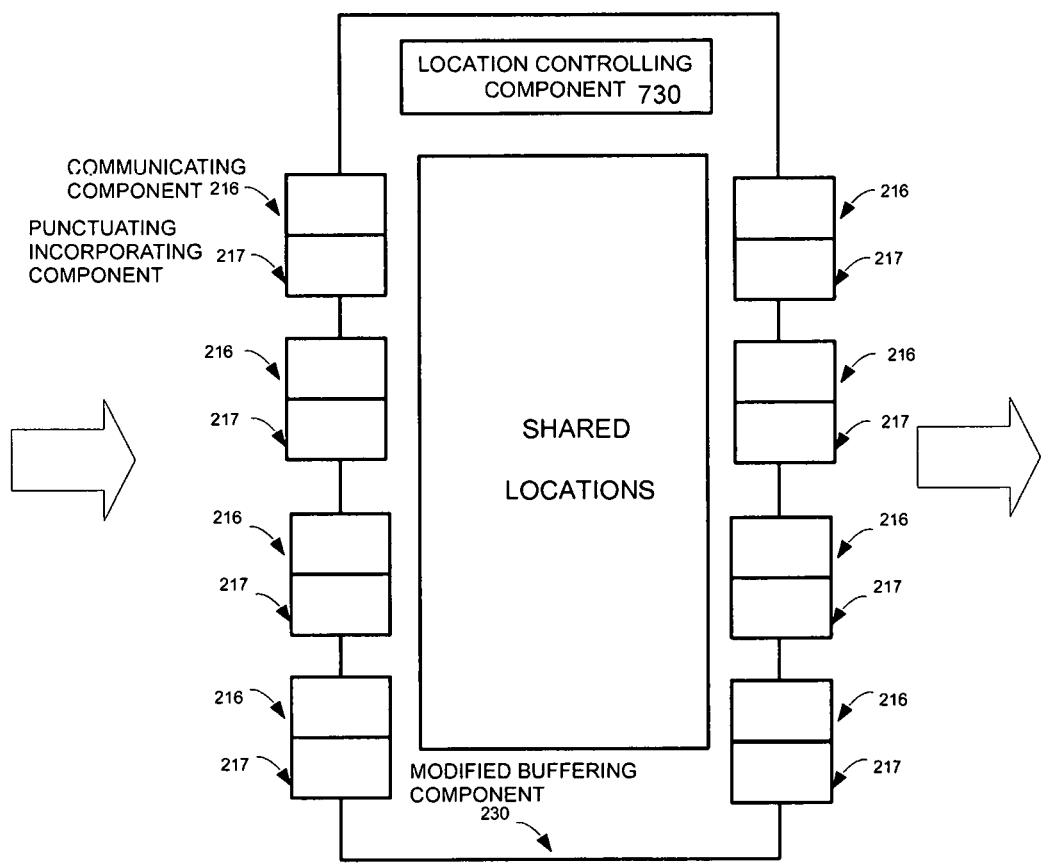
FIG. 5 illustrates a system that facilitates buffering a plurality of data in accordance with an aspect of the innovation

In accordance with the present innovation, novel techniques are adopted for buffering data as they are transferred through the system (100). As the FIG. 5 illustrates, a modified buffering component (230) with shared locations that receives data comprises of shared locations with dynamic identities for buffering, a variable clock, modified communicating components (216) coupled to a punctuation incorporating component (217) and a variable clock apiece, with dynamic identities for each shared location, a location controlling component coupled to a plurality of variable clocks. As data is received, based on the interrelations and patterns of interrelations established by the computing component (150) and the statistical and probabilistic analytical engines (175), the inferences are made for the location controlling component to assign a dynamic location identity and for the plurality of variable clocks to assign a dynamic time identity for each data.

The specific time and location identity of each of the data and the fact that the location of data can be shared, i.e. accessible for more than one function, enable fulfilling multiple requests for data (e.g. data on voltage and current to derive Wattage for an LCD display and same data on voltage and current to derive the resistance to be correlated with Temperature). The specific time and location identity and the accessibility enables correlating a plurality of data with other data (e.g. correlation through time and location identity of voltage in a fan circuit with a specific fan speed and a specific temperature in the past that was recorded separately), simultaneously.

As illustrated through the above example, since the novel instruments in the present innovation dynamically assigning specific identities for each of the data states, as well as for each of the data transferring and buffering locations (e.g. ports of modified communicating components and shared locations of buffering components), enable handling of a plurality of data simultaneously, thus facilitating responding to requests that involve functions including, but not limited to, arithmetical functions such as addition, subtraction as well as comparing, engaging the modified communicating components and modified buffering components with shared locations, that operate on the instructions of the computing component, based upon the inferences of the statistical and probabilistic analytical engines.

Adopting 'no electricity' electrical characteristics and the temporal characteristics based upon the variable operational step of the computing component and the statistical and probabilistic analytical engines, in one key aspect of the present innovation, these novel instruments facilitate diversified approaches to data processing. Conventionally, data processing utilises a group of characteristics of a 'bit', namely, the fixed voltage, fixed time unit as well as fixed numerical value, based on the radix-2, ascribed to it.

The novel instruments adopted in the present innovation facilitate ascribing different associations to each of the data states (e.g. numeral values based on dynamically assigned radices, colors based on the respective interrelations and their patterns among the primary colours), and, interchanging of such associations (e.g. numeral values to colours etc; and vice versa) as well. As these dynamically determined electrical and temporal characteristics, including 'no electricity' characteristics, of the respective data states are derived by the novel instruments adopted in the present innovation, mentioned supra, at the elemental units (510), elemental composites, elemental devices (560) and elemental components (575) scales in the system (100) and configured through their respective scalable implements (e.g. port of a modified logic gate, a modified communicating component) in data handling, they enable these formulating interchangeable associations, in order to suit different contexts of these configuring, transferring, processing, storing, retrieving and communicating as outputs, while retaining their creation identities. While having different and interchangeable associations, these data states can be processed simultaneously, employing a plurality of components (e.g. modified logic gates, modified communicating components) that operate in parallel, incorporating new dimensions in data handling.

The novel instruments adopted in the present innovation utilise the 'no electricity' electrical characteristics and the temporal characteristics of these data states, accompanied by the punctuations, to enable them to be transferred through the pluralities of the respective components (e.g. modified logic gates) while each of their temporal characteristics (e.g. duration formed into temporal segments), with its corresponding association (e.g. colour) accounted for as a logic state in implementing logic functions, thus facilitating expanding the scope of data handling.

Adopting these 'no electricity' characteristics, optimise the number and configuration of the logic functions and the modified logic gates (450) as well, thus diversifying processing of data. These novel techniques adopt the 'no electricity' temporal states and the variable operational step of the computing component, and the statistical and probabilistic analytical engines that analyse the information and establish the interrelations of the characteristics with previous formulations of information as data to derive the optimum combination characteristics for each of the data, with dynamically determined temporal extents and temporal states in each of these extents, as well as dynamically assigned logic identities through an optimum combination of modified logic gates to facilitate the implementation of logic functions.

As mentioned supra, in utilising these data states in logic functions, each of their temporal segments, segmented in terms of the operational step of the computing component and the statistical and probabilistic engines, assumes the function of a logic state with dynamically determined logic identity each, and with dynamically determined durations, thus, facilitating establishing each of such data states as a sequence of logic states for implementation of logic functions. These novel instruments incorporate the logic identities, based on the inferences by the statistical and probabilistic analytical engines, while maintaining the correlations of the characteristics of the respective associations (e.g. numeral values, colours) of the data states and the sequences in terms of the temporal dimension for implementing respective logic functions established by the computing component and the statistical and probabilistic analytical engines, based upon the analyses and interrelations and patterns in terms of the variable operational step. In one key aspect of the present innovation, for establishing these sequences of logic states, 'no electricity' characteristics is adopted while providing dynamically determined logic identities and temporal extents to these logic states, as mentioned supra.

The punctuations for the logic states are effected by the punctuation incorporating component (217) that accompany the modified communicating components (216), connected to a variable clock each, based upon the instructions by the computing component, derived from the inferences by the statistical and probabilistic analytical engines. These punctuations are received by the respective punctuation locking components that accompany the modified communicating components at the modified logic gates, while the computing component and the statistical and probabilistic analytical engines establish the logic identities of the respective logic states taking into account the respective electrical and temporal characteristics of these punctuations in order to implement the logic functions.

The computing component, based on the inferences of the statistical and probabilistic analytical engines, make instructions to the respective punctuation incorporating component and its variable clock, to incorporate the punctuations as per the logic identities of the respective logic states for implementing the corresponding logic function, while utilising the smaller temporal units of the variable operational step to monitor whether the logic identities have been established with the assistance of error handling protocols. In situations where the first instance of transferring the punctuations that accompany logic states, with their respective electrical and temporal characteristics do not establish the required logic identities at the specific punctuation locking component (217) at the modified logic gate to the logic states, the computing component and the statistical and probabilistic analytical engines, adopting its shorter time units in the variable operational step, monitor and initiate creation and transfer of punctuations with higher variations in electrical characteristics and increased temporal extents repeatedly, until the logic state with required identity is received.

As required in practical applications in implementing logic functions, these novel instruments, adopting the computing component and the statistical and probabilistic analytical engines, conduct dynamic analyses to establish interrelations and patterns among the requests for output, time units of data states of the input data, the logic functions and algorithms to be adopted and the configuration of groups of modified logic gates in implementing logic functions and algorithms.

These novel instruments also facilitate formulating the optimum arrangement of logic functions and the optimum configurations of the modified logic gates and the corresponding compositions of the respective logic states derived from the data states to generate the requested output. A configuration of these modified logic gates, a person skilled in the art will note, can be utilised to derive many an application of the novel features of the present innovation, as the diversification and modifications to logic gates enable their utilisation in applications such as logic implementing components and controllers, as well as processors, and any other context, based on logic gates operating on electricity and temporal states.

In order to optimally operate a sequence of logic functions, the computing component and the statistical and probabilistic analytical engines may vary the identity of selected the modified logic gates (450) during the implementation of such logic functions, as the modified logic gates have no fixed logic function identities (e.g. AND, OR, NAND and XOR).

These novel techniques, in accordance with the present innovation, diversify the functionality of the modified logic gates. Adopting the 'no electricity' characteristics as well as the time and location identity of each data state, in one key aspect of the present innovation, these instruments incorporate the modified buffering components with shared locations in the modified logic gates, while adopting the variable operational step of the computing component and the statistical and probabilistic analytical engines, to initiate dynamic variations during the implementation of logic functions. In accordance with the present innovation, these instruments effect dynamic variations during the implementation of logic functions by providing data inputs through the modified buffering components incorporated within the modified logic gates, which enables data to be combined together with data transferring through a plurality of modified communicating components as well as with data that entered into the buffering component earlier, or enter subsequently, and, thus, having other temporal and location identities, which facilitate functionally diversifying a modified logic gate to implement a plurality of logic functions.

In one key aspect of the present innovation, simultaneous implementation of a plurality of logic functions, utilising a plurality of modified logic gates and accompanying components, including modified buffering components with shared locations, interlinked in more than one plane within components and their parts, where each of these modified logic gates can be connected with a plurality of other modified logic gates, as well as other devices. These novel techniques, utilising the 'no electricity' characteristics of the data, based on the inferences of the computing component and the statistical and probabilistic analytical engines, facilitate data handling tasks in a time and location specific manner, with modified logic gates and other components in these multi dimensional lattices aggregating and disaggregating data, while they are being processed.

Figure 8:
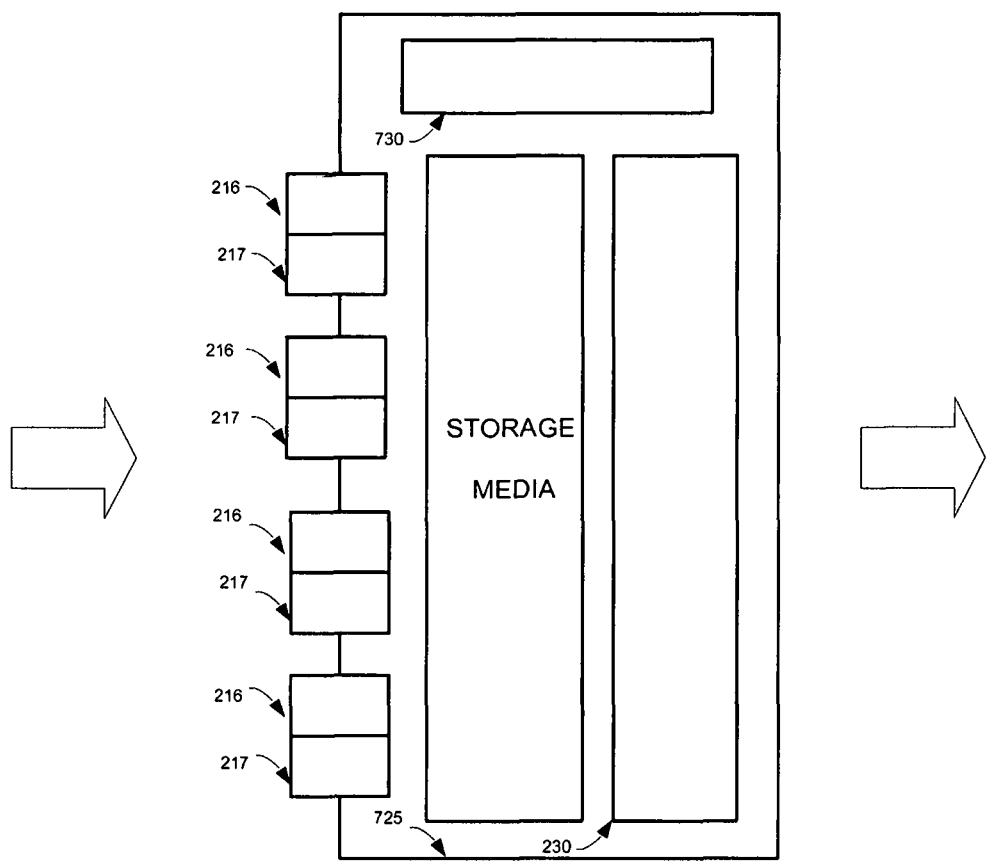
FIG. 8 illustrates a system of that facilitates offline storing a plurality of data in accordance with an aspect of the innovation

In accordance with the present innovation, the application of these novel techniques can also be described in relation to data storage and retrieving, as schematically illustrated in FIG. 8, both during the operation of data handling (e.g. memory) and in offline storage (e.g. hard drives).

In one key aspect of the present innovation, the computing component and the statistical and probabilistic analytical engines make dynamic analyses of the information of the data states required to be stored, including the corresponding time units of each of the data states, where relevant, together with creation identities, in terms of the respective time and location identities of creation.

In one key aspect of the present innovation, based on the dynamic analyses, these novel instruments make inferences for action to the plurality of modified communicating components and the plurality of variable clocks, on the time units of the each of the data states of data to be stored, as well as the punctuations that differentiates each of the data states from the other ones.

As the modified communication components and the accompanying plurality of clocks formulate the data incorporating the respective time units and the punctuations for storage, the inferences for action are made on storage of data based on their respective time units to the location controlling component with storing index (730) in the offline storing component (725) that comprise one or, more medium of offline storage, including, but not limited to, magnetic drives, optical drives, solid state drives, among other formats of data storage. The location controlling component records the respective location and port identities of each of data or group of data stored in each of the storage media in the storage location index, and store the compiled records as part of storing exercises, thus enabling simultaneous storage at different media and at different locations. As these indices assume the role of the key, to each of the dynamically determined formats of data being stored, in accordance with the present innovation, these novel instruments utilise such indices as a multi-purpose instrument. Since the novel instruments utilise the feature as keys to the respective formats of the data stored to adopt the indices as part of a data security system (e.g. by storing the indices at a location and media separate from storing location of data) as well as to formulate in a specific dynamically determined format, these indices can be used for recreating data, at another location, in another media and, in another data handling system.

In accordance with the present innovation, in retrieving the stored data, the computing component (150) and the statistical and probabilistic analytical engines make the inferences for action to the location controlling component for retrieval, based on the dynamically assigned location and modified communication component address of data to be reformulated as per the requests for stored data.

Storage of data in memory, or, online storage during the operation of data handling, adopts similar techniques and, compared to offline storage, it requires only the location controlling component and a plurality of clocks. In retrieving data from memory, the statistical and probabilistic analytical engines make inference for action on request for data, based on location or communicating component address of each data, for its retrieval.

Novel features adopted in the present innovation facilitate simultaneous storage through configuration of a plurality of modified communicating components, to handle data simultaneously in storing and retrieval. The novel instruments adopted in the present innovation facilitate generating a variety of different outputs (e.g. facilitate video output of the handled data while transferring data to a server remote location) utilising the data handled by the system (100), simultaneously.

Figure 9:
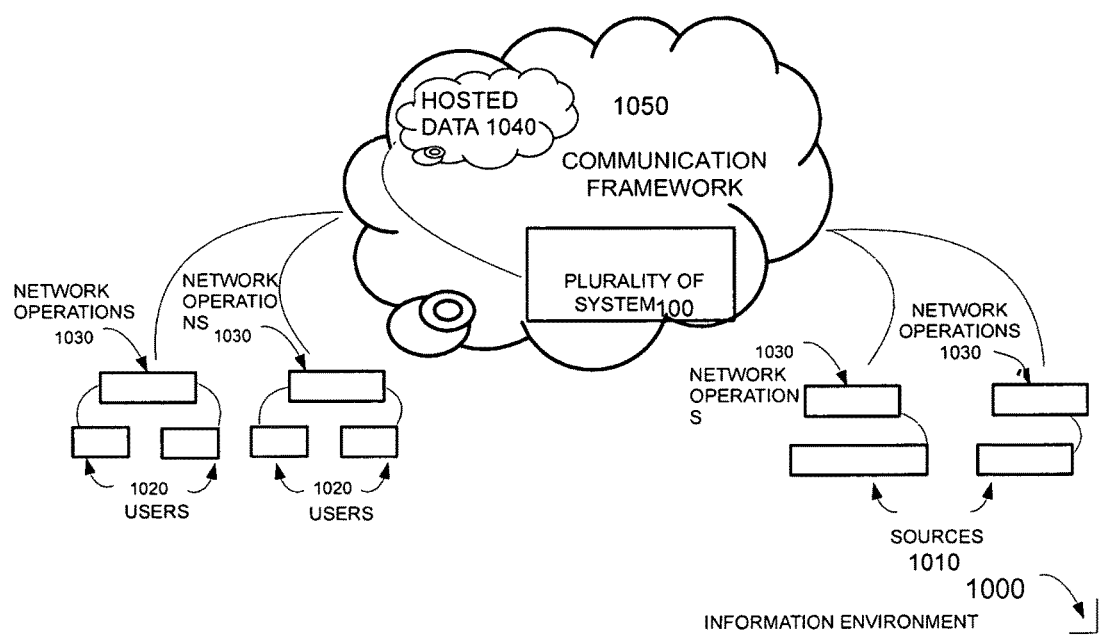
FIG. 9 illustrates a system that facilitates operating a communication framework in accordance with an aspect of the innovation

In accordance with the present innovation, application of these novel techniques can also be described in relation to a range of aspects in data handling in a communication framework (1050) in an information environment (1000). As shown in FIG. 09, a plurality of requests for data from users (1020) is directed through the interface (e.g. WiFi, ethernet) and network operations (1030) (e.g. ISP) through the communication framework (1050) to the sources (1010) (e.g. servers).

In accordance with the present innovation, a plurality of systems, adopting the approach, structure and features of the system (100), facilitate operating the communication framework (1050), by conducting dynamic analyses of the requests for data as well as of the characteristics of data at pluralities of bodies of data in disparate sources. Based on the analyses, these novel techniques formulate dynamic indices of characteristics of data such as, but not limited to, time unit based data structures of data packs at disparate sources, in relation to the plurality of requests for data transfer and, establishes dynamic correlations and patterns among them. Utilising the interrelations and patterns of interrelations established, these novel instruments make inferences on dynamic formulation of optimum configurations (e.g. time units in respective data packs) for handling of data, including communication framework hosted data (1040), (e.g. data in 'clouds') incorporating 'no electricity' data states as well, for simultaneous operations.

The novel instruments adopted in the present innovation that conduct dynamic configuration of data enable formulating different data formats, for handling the identical data at same source to fulfill different requests. These novel techniques also enable improving safety for data in these environments, as the dynamic configuration of data, based on analysis of data characteristics at sources and specific queries for data, provide security at each step in data handling and makes it difficult for intrusions, including malware, to configure themselves in order to be able to operate in these contexts.

In another aspect of the present innovation, these novel instruments facilitate, through the techniques on dynamic formulation of data for handling, to 'assemble' data from different sources (e.g. servers), in context specific and optimum manner, in addition to transferring data from fixed sources while facilitating 'montaging' of data (e.g. montaging web based data at different sources to create a real time multi media experience) at the delivery, for example, Internet Service Providers' servers, as per requests.

In accordance with the present innovation, application of these novel instruments in data handling in communication frameworks facilitates simultaneous conversion, generation, receiving and processing of data in fulfilling multiple requests through configuration of a plurality of components within and among systems. In another aspect of the present innovation, application of these novel techniques for dynamic formulation and implementation of algorithms and logic functions, mentioned above, can be effectively utilised in data handling in these environments, i.e. communication frameworks, as well.

These novel instruments also provide the basis for a range of technological services that facilitate the functioning of communication frameworks, including the Internet, both in background services and applications for effective data handling and optimizing energy usage as well as front end roles such as search engines and data delivery.

It is evident thus, in accordance with the present innovation, these novel instruments can be utilised in a flexible manner, across wide range of scales (e.g. smallest scale individual processors in stand alone operations to large scale communication frameworks) as well as in different machine readable media (e.g. optical, magnetic, through networks and communication frameworks) that may follow and make use of different manufacturing and operational methods, making use of the approach and description presented here, by a person skilled in the art.

What is described above includes only a few examples of the numerous aspects that are encompassed within the present innovation. It is, evidently, not practicable to enumerate every possible combination of compositions or, methodologies for the purpose of providing a description of the present innovation, but a person skilled in the art would recognise that, many further combinations and permutations of the innovation are possible. The present innovation is intended to embrace all such alterations, modifications and variations that come within the spirit and scope of the appended claims, accordingly. Furthermore, to the extent that the term 'includes' is used, either in the detailed descriptions or in the claims, such term is intended to be inclusive in a manner similar to the term comprising, as 'comprising' is interpreted, when employed as a transitional word in a claim.

What is claimed is:

1. A system that facilitates information management comprising:
   a processor;
   a plurality of sources, run on the processor, each of which is adapted to transfer a plurality of data with a data handling component;
   the data handling component which further comprises a computing component adapted to employ at least one of a plurality of statistical and probabilistic analytical engines, wherein the computing component includes a variable operational step of which the shortest variable operates in a duration lesser than the smallest period of time required for the transition from one predetermined electrical property level to another predetermined electrical property level upon effecting predetermined variations in supply of external electrical energy to each of a plurality of elemental units;
   the computing component adapted to effect a plurality of periodic interruptions to and resumptions of supply of external electrical energy to each of the elemental units for predetermined durations based upon said variable operational step that enable the formulation of corresponding durations of electrically non-conductive property levels and electrically conductive property levels in said elemental units;
   and the durations of electrically conductive property levels each of which corresponds with an electric signal that precedes and succeeds each of said electrically non-conductivity durations in the elemental units, thereby establishing a framework for data handling based at least in part upon the basis that formulates said durations of electrical non-conductivity is facilitated.

2. The system of claim 1, wherein each of a plurality of processing components at the sources further comprises a reference characteristic receiving component which includes a connection to a reference characteristic modificating component that is adapted to vary the reference adopted for analysing each of the reference characteristics; a modified communicating component coupled to a punctuation incorporating component that facilitate transferring data with the data handing component; and further adapted to adopt said references to ascribe one or more associations to one or more data states.

3. The system of claim 1, wherein is further adapted to ascribe one or more associations to each of a plurality of data states at configuration of each of the data states; at transfer of the data states; at buffering of the data states; at storing online or offline of the data states; at conducting of a logic function using the data states; at producing an output of the logic function using the data states; at communicating the output across different formats and media.

4. The system of claim 3, wherein is further adapted to vary the ascribed associations to each of the data states; dynamically establish interrelations and patterns of the interrelations among the ascribed associations that have been provided to the plurality of data states; and adopt the interrelations and the patterns of the interrelations of the ascribed associations in dynamically determining the requirement to configure each of the data states; to transfer the data states; to buffer of the data states; to store online or offline of the data states; to conduct a logic function using the data states; to produce an output of the logic function using the data states; and to communicate the output.

5. The system of claim 1, wherein the computing component includes a processing component that comprises a plurality of modified communicating components each coupled to a punctuation incorporating component apiece and a modified buffering component for transferring the plurality of data with the sources; and a switching component that is adapted to effect interruptions to and resuming supply of electricity to at least one of the selected components of the computing component upon said computing component receiving a signal from a signaling component.

6. The system of claim 1, wherein the computing component further comprises a plurality of connections to a plurality of activating components that effect variations in supply of external electrical energy to a plurality of elemental units, a plurality of conductive units and a plurality of insulated conductive units based upon the inferences of the statistical and probabilistic analytical engines.

7. The system of claim 6, wherein each of the activating components comprises a plurality of connections to a plurality of elemental units, to a plurality of conductive units and to a plurality of insulated conductive units that facilitate a plurality of electrical interconnectivities.

8. The system of claim 6, wherein each of the plurality of conductive units and each of the plurality of insulated conductive units comprises connections to at least one elemental unit for establishing an electrical field upon supply of external electrical energy.

9. The system of claim 6, wherein each of the elemental units further comprising a plurality of connections to a plurality of elemental units for forming a plurality of electrical interconnectivities.

10. The system of claim 6, wherein each of the activating components further directs a plurality of return electrical charges, generated upon each of the interruptions to the supply of electricity, as power supply to at least one of the components or any other device in the system.

11. The system of claim 1, wherein the computing component further includes a plurality of connections to a plurality of modified buffering components that are adapted to assign identities for each of a plurality of buffered data.

12. The system of claim 1, wherein further includes a plurality of modified logic gates that are adapted to implement a plurality of logic functions.

13. The system of claim 12, wherein each of the plurality of modified logic gates further comprises a plurality of modified communicating components each coupled to a punctuation incorporating component apiece; and at least one modified buffering component that are adapted to transfer a plurality of data with other devices and components.

14. The system of claim 1, wherein the computing component further includes connections to a plurality of modified offline storing components that are adapted to store and retrieve the plurality of data in a plurality of formats, at a plurality of locations and in a plurality of media.

15. The system of claim 14, wherein each of the modified offline storing components further comprises a plurality of storage media, a modified buffering component and a location controlling component with storing indices that are adapted to store and retrieve data.

16. The system of claim 1, wherein the data handling component further includes connections to a plurality of Input Output devices adapted to generate a plurality of outputs in a plurality of formats, in a plurality of media and at a plurality of locations.

17. The system of claim 1, further operates on one or more machine readable media.

18. A computer-implemented method of facilitating information handling, comprising:
obtaining a plurality of information at a plurality of sources;
and providing a basis for analysing the information based at least in part upon a framework for establishing the period of time of each of a plurality of interruptions to and commencements of the supply of external electrical energy upon which each of a plurality of elemental units transits among predetermined electrically non-conductive and electrically conductive property levels that determine the non-transmission and transmission of a plurality of electrical signals in said elemental units.

19. The computer-implemented method of claim 18, further comprising establishing the basis for analysing the information based at least in part upon the variable operational step of the computing component and the statistical and probabilistic analytical engines that provides the framework for determining each of the interruptions to the supply of external electrical energy electricity to the elemental units.

20. The computer-implemented method of claim 18, further comprising establishing interrelations and patterns of the interrelations each of the characteristics of the plurality of information; and further comprising adopting said characteristics of the information for ascribing one or more associations at configuring one or more data states.

21. The computer-implemented method of claim 20, further comprising ascribing one or more associations to each of the data states at transfer of the data states; at buffering of the data states; at storing online or offline of the data states; at conducting of a logic function using the data states; at producing an output of the logic function using the data states; at communicating the output across different formats and media.

22. The computer-implemented method of claim 21, further comprising varying the ascribed associations to each of the data states; dynamically establishing interrelations and patterns of the interrelations among the ascribed associations that have been provided to the plurality of data states; and adopting the interrelations and the patterns of the interrelations of the ascribed associations in dynamically determining the requirement to configure each of the data states; to transfer the data states; to buffer of the data states; to store online or offline of the data states; to conduct a logic function using the data states; to produce an output of the logic function using the data states; and to communicate the output.

23. The computer-implemented method of claim 16, further comprising formulating the interrelations and patterns of the interrelations of the plurality of information.

24. The computer-implemented method of claim 16, further comprising effecting interruptions to and commencement of receiving each of characteristics of the plurality of information.

25. The computer-implemented method of claim 16, further comprising configuring each of the plurality of elemental units by providing each of a plurality of predetermined electrical functionalities and predetermined electrical property levels at each of a plurality of variable temporal extents in each of the configurations, whereby transferring a plurality of electrical signals is facilitated.

26. The computer-implemented method of claim 16, further comprising effecting variations in supply of predetermined extents of external electrical energy at each of a plurality of variable temporal extents in each of the elemental units in the configurations, whereby a plurality of predetermined electrical property levels are provided for facilitating transferring a plurality of electrical signals.

27. The computer-implemented method of claim 16, further comprising effecting variations in supply of predetermined extents of external electrical energy at each of a plurality of variable temporal extents in each of the conductive units in the configurations, whereby a plurality of predetermined electrical field levels are provided for facilitating transferring a plurality of electrical signals.

28. The computer-implemented method of claim 16, further comprising effecting variations in supply of predetermined extents of external electrical energy at each of a plurality of variable temporal extents in each of the insulated conductive units in the configurations, whereby a plurality of predetermined electrical field levels are provided for facilitating transferring a plurality of electrical signals.

29. The computer-implemented method of claim 16, further comprising formulating each of the electrical and temporal characteristics of each of the electrical signals.

30. The computer-implemented method of claim 16, further comprising establishing a basis for analysing a plurality of information from sources that do not establish information transfer protocols with the data handling component for formulation as data; and generating inferences for error handling in formulating data.

31. A computer-executable system that includes a processor and a plurality of components that run on the processor that facilitates data handling, comprising:
computer-implemented means for formulation of a plurality of information as a plurality of data and transferring a plurality of data from a plurality of disparate sources; and for implementing logic functions on the plurality of data and communicating the output of logic functions as data based at least in part upon a basis that establishes each of a plurality of interruptions to the supply of external electrical energy that facilitates formulating variations in electrically non-conductive and electrically conductive properties that determine the non-transmission and transmission of a plurality of electrical signals in a plurality of elemental units.

32. The computer-executable system of claim 31, further comprising means for formulating the basis for handling the plurality of data based at least in part upon the variable operational step of the computing component and the statistical and probabilistic analytical engines that forms the framework that determines each of the interruptions to the supply of external electrical energy.

33. The computer-executable system of claim 32, further comprising means for formulating each of a plurality of configurations of elemental devices; a plurality of configurations of elemental components, and a plurality of configurations of other selected components and devices at each of a variable durations based at least in part upon the variable operational step.

34. The computer-executable system of claim 32, further comprising means for formulating each of the durations in establishing each of the predetermined combinations of the electrical properties; and means for formulating each of the durations of the transitions from each of the plurality of predetermined combinations of electrical properties to each of a plurality of another predetermined combinations of the electrical properties in each of the configurations of elemental devices, of elemental components and of other selected components and devices.

35. The computer-executable system of claim 32, further comprising means for formulating each of the durations of each of the predetermined combinations of electrical properties in each of the plurality of electrical signals that are transmitted; and means for formulating each of the durations of each of the interruptions to the plurality of electrical signals that are transmitted in the configurations of elemental devices, of elemental components and of other selected components and devices that comprise configurations of elemental devices, of elemental components and of other similar components and devices.

36. The computer-executable system of claim 32, further comprising means for sending and receiving a plurality of requests for data in a plurality of formats and with a plurality of interfaces, simultaneously.

37. The computer-executable system of claim 32, further comprising means for transferring a plurality of data in a plurality of formats, with a plurality of interfaces, simultaneously.

38. The computer-executable system of claim 32, further comprising means for incorporating identities in a plurality of data, simultaneously.

39. The computer-executable system of claim 32, further comprising means for processing a plurality of data that have varied electrical characteristics and varied temporal characteristics, simultaneously.

40. The computer-executable system of claim 32, further comprising means for reversing, recreating and copying a plurality of data, in a plurality of formats, in a plurality of media and at a plurality of locations, simultaneously.

41. The computer-executable system of claim 32, further comprising means for buffering a plurality of data at a plurality of shared locations that have variable identities; and means for accessing the buffered data at the plurality of shared locations, simultaneously.

42. The computer-executable system of claim 32, further comprising means for establishing a plurality of interrelations of the characteristics of information in configuring, transferring, storing online and offline of a plurality of data states; conducting logic functions, and producing an output using the data states; and communicating the output across different formats and media, simultaneously.

43. The computer-executable system of claim 42, further comprising means for ascribing one or more associations to each of the data states based on said interrelations of the characteristics of information, at configuration of each of the data states; at transfer of the data states; at buffering of the data states; at storing online or offline of the data states; at conducting of a logic function using the data states; at producing an output of the logic function using the data states; at communicating the output across different formats and media, simultaneously.

44. The computer-executable system of claim 43, further comprising means for varying the ascribed associations to each of the data states; dynamically establish interrelations and patterns of the interrelations among the ascribed associations that have been provided to the plurality of data states; and adopt the interrelations and the patterns of the interrelations of the ascribed associations in dynamically determining the requirement to configure each of the data states; to transfer the data states; to buffer of the data states; to store online or offline of the data states; to conduct a logic function using the data states; to produce an output of the logic function using the data states; and to communicate the output.

45. The computer-executable system of claim 32, further comprising means for sending and receiving a plurality of requests for implementing a plurality of logic functions for a plurality of data, simultaneously; and means for deriving each of the pluralities of logic states from each of the data states for implementing a plurality of logic functions, simultaneously.

46. The computer-executable system of claim 32, further comprising means for formulating the sequences of logic states for implementing a plurality of logic functions for the plurality of data, simultaneously.

47. The computer-executable system of claim 46, further comprising means for dynamically assigning a plurality of logic functions for conducting the logic functions using the plurality of data, in a plurality of formats and at a plurality of locations for implementation, simultaneously.

48. The computer-executable system of claim 32, further comprising means for implementing a plurality of logic functions for the plurality of data, simultaneously.

49. The computer-executable system of claim 32, further comprising means for obtaining a plurality of outcome of implementing a plurality of logic functions for the plurality of data, in a plurality of formats and in a plurality of locations, simultaneously.

50. The computer-executable system of claim 32, further comprising means for assigning the identities of a plurality of modified logic gates for implementing a plurality of logic functions for the plurality of data, simultaneously.

51. The computer-executable system of claim 32, further comprising means for implementing a plurality of algorithms that include a plurality of sequences of a plurality of logic functions for the plurality of data, simultaneously.

52. The computer-executable system of claim 32, further comprising means for interconnecting each of the modified logic gates with a plurality of modified logic gates and other similar components and devices for implementing a plurality of logic functions, simultaneously.

53. The computer-executable system of claim 32, further comprising means for incorporating a plurality of sequences of logic states during the implementation of a plurality of logic functions, simultaneously.

54. The computer-executable system of claim 32, further comprising means for varying each of the algorithms during implementation.

55. The computer-executable system of claim 32, further comprising means for establishing security procedures in handling the plurality of data.

56. The computer-executable system of claim 32, further comprising means for sending and receiving a plurality of requests for storing a plurality of data at a plurality of online storing media, in a plurality of offline storing media and in a plurality of formats, simultaneously; means for configuring a plurality of data for offline storing in a plurality of locations, in a plurality of storage media and in a plurality of formats, simultaneously; and means for offline storing a plurality of data in a plurality of locations, in a plurality of formats and in a plurality of storage media, simultaneously.

57. The computer executable system 56, further comprising means for formulating each of the storing indices of the plurality of data in a plurality of data formats, in online storing and in storing offline.

58. The computer executable system 56, further comprising means for formulating each of the storing indices as a basis for recreating data.

59. The computer-executable system of claim 32, further comprising means for retrieving a plurality of offline stored data from a plurality of locations, in a plurality of storage media and in a plurality of formats, simultaneously; and means for configuring a plurality of data at a plurality of locations, in a plurality of storage media and in a plurality of storage formats, upon retrieval, simultaneously.

60. The computer-executable system of claim 32, further comprising means for handling a plurality of data at disparate sources upon a plurality of requests at a plurality of locations for operating a plurality of communication frameworks, simultaneously.

61. The computer-executable system of claim 60, further comprising means for establishing security procedures for operating the communication frameworks, simultaneously.

62. The computer-executable system of claim 60, further comprising means for performing a plurality of technological services for operating the communication frameworks.

63. The computer-executable system of claim 62, further comprising means for performing services related to conducting searches for data from disparate sources adopting dynamically formulated customised algorithms; and assembling and montaging of data from different sources to fulfill the requirements of said data searches.

* * * * *